United States Patent [19]

Hilliard et al.

[11] Patent Number: 4,716,874
[45] Date of Patent: Jan. 5, 1988

[54] CONTROL FOR SPARK IGNITED INTERNAL COMBUSTION ENGINE

[75] Inventors: John C. Hilliard; Anthony K. F. Chan, both of Ann Arbor, Mich.

[73] Assignee: Champion Spark Plug Company, Toledo, Ohio

[21] Appl. No.: 780,781

[22] Filed: Sep. 27, 1985

[51] Int. Cl.$^4$ .............................................. F02P 5/15
[52] U.S. Cl. .................................... 123/425; 123/479
[58] Field of Search ............... 123/416, 417, 418, 419, 123/425, 435, 436, 440, 479; 73/35, 116

[56] References Cited

U.S. PATENT DOCUMENTS 4,378,771  4/1983  Sawada et al. ................. 123/479 X

FOREIGN PATENT DOCUMENTS

0120779  7/1984  Japan .................................. 123/425
2105408  3/1983  United Kingdom ................ 123/425

Primary Examiner—Willis R. Wolfe, Jr.
Attorney, Agent, or Firm—MacMillan, Sobanski & Todd

[57] ABSTRACT

An improved control to establish ignition timing in a spark ignited internal combustion engine near optimum efficiency without knock and/or anomalous combustion. The control operates in response to a detected ion and charged particle current in the engine exhaust and to timing pulses from the engine. When the engine is operating under steady state conditions and retarded from the point of incipient knock and/or anomalous combustion, there is very little time change in the averaged exhaust current data. When incipient knock or anomalous combustion is approached, scatter in the averaged exhaust current data significantly increases. The detected scatter in the averaged exhaust current data is used to optimize engine operation for each combustion chamber.

15 Claims, 10 Drawing Figures

CONTROL FOR SPARK IGNITED INTERNAL COMBUSTION ENGINE

TECHNICAL FIELD

The invention relates to controlling ignition timing in a spark ignited internal combustion engine and more particularly to an improved electronic control responsive to ionized exhaust gases for operating each individual combustion chamber in a spark ignited internal combustion engine at optimum efficiency without knock and/or anomalous combustion. As used herein, "combustion chamber" means a main combustion chamber and excludes a pre-combustion chamber.

BACKGROUND ART

It is well known that the spark timing in a spark ignited internal combustion engine affects the operation of the engine. As the spark timing for a cylinder is advanced before the top dead center position of the piston, fuel consumption decreases and the output torque increases to a predetermined value. However, if the spark timing is advanced too far, knocking or anomalous combustion will occur. Severe knocking will seriously damage the engine, for example, by melting the piston or by over stressing the mechanical components of the engine. Knock also causes a loss in fuel economy and torque. Many factors affect the spark timing at which knocking begins in an engine. The octane rating of the fuel, the engine speed and combustion chamber design, the cooling capacity of the cylinder walls, the spark plug heat range and the air to fuel ratio are some of the factors which affect the onset of knock. Also, combustion deposits on the walls of the combustion chamber will lead to an octane requirement increase (ORI) which will vary between the different combustion chambers in an engine.

In a typical multicylinder engine, there is a variation in combustion between the different cylinders. Variations in the temperature of the combustion chamber walls and in deposits on the combustion chamber walls may cause one combustion chamber to begin to knock prior to the other combustion chambers as the spark timing is advanced. Or, one combustion chamber may begin to knock prior to the others due to variations in the air to fuel ratio at the different combustion chambers. The combustion process within a single combustion chamber also may vary from cycle to cycle. For a given engine, ignition timing is set for the worst combustion chamber in order to prevent any occurrence of knock. However, knock may still occur in one or more combustion chambers with changes in fuel quality, unless the engine is retuned. If the onset of knock can be detected automatically for each combustion chamber in an engine and the spark timing can be controlled individually for each combustion chamber in response to incipient knock detection, the engine can be operated at a higher efficiency without the occurrence of knock.

Several different methods have been used for detecting knock in an operating internal combustion engine. The most common method senses engine vibrations. Knock causes an engine to vibrate in a specific frequency range. When vibrations are sensed within this range, some prior art systems retard the spark timing to eliminate the knock. When a vibration type sensor is used, the timing is retarded equally for all combustion chambers since vibration sensors cannot easily discriminate between individual combustion events. Systems of this type have several disadvantages. The electrical output of the vibration sensing knock detector must be filtered to remove background noise, thereby increasing the response time and reducing the sensitivity of such detectors. Also, vibration sensing knock detectors are responsive only after the engine is well into the knock region since the knock must be sufficient to appreciably vibrate the engine. Vibration sensing knock detectors are not responsive to incipient knock and are very sensitive to their location on the engine. Holographic methods are often required to identify the best detector location.

It also is known in the prior art that when knock occurs in an internal combustion engine, there is a pressure increase and oscillations in the combustion chamber and the combustion gases are ionized for a short time. By applying a voltage across an electrode gap within the combustion chamber and looking at the ionization current, the pressure increase within the combustion chamber can be detected to indicate the occurrence of knock. Such a system is shown, for example, in U.S. Pat. Nos. 2,543,141 to Vichnievsky 4,232,545 to Dobler et al. 4,262,524 to Russo et al. and 4,444,172 to Sellmaier et al. disclose systems in which ionization is detected at the gap of a conventional spark plug after the spark plug is fired to initiate combustion. Each of these patents disclose a sytem for detecting knock in a combustion chamber, but none disclose details of a control for modifying spark timing to prevent knock in response to the sensed condition. U.S. Pat. No. 4,308,519 to Garcea et al. uses two spaced probes in the combustion chamber to detect ionization caused by knock and discloses decreasing or slowing down the rate of increase in spark advance in response to the output from the probes.

The prior art also teaches that the exhaust gas from the engine is ionized by a post combustion process. When the air to fuel mixture is increasingly leaned out, the combustion process is displaced to a greater extent into the domain of the expansion stroke of the piston until a well-defined post combustion process takes place within the exhaust system of the engine. The magnitude of this post combustive reaction can be detected by means of an ion current sensor located downstream of the exhaust valve within the engine exhaust system, as shown in U.S. Pat. No. 4,372,270 to Latsch et al., wherein a conventional spark plug is mounted in the engine exhaust manifold as an ionization sensor. A voltage is applied to the spark plug and the resulting current when ionized gas is present at the sensor is measured and integrated to detect the air to fuel ratio. This patent suggests using the ion detector signal for adjusting the air to fuel ratio or for adjusting spark advance, although no details are provided for implementing such an adjustment. Nor is there a teaching of individually adjusting spark advance for each combustion chamber since the ionization sensors for each combustion chamber are connected in parallel.

DISCLOSURE OF INVENTION

The invention is directed to an improved control system for detecting incipient knock and pre-ignition in an operating spark ignited internal combustion engine and for controlling spark advance to optimize the engine operating efficiency without knock. It has been found that when knock or incipient knock or anomalous combustion occurs in an operating engine, there is a change in a short duration ionization pulse when occurs in the engine exhaust shortly after the exhaust valve opens. The ionization pulse appears to be the result of both positively charged gaseous ions and, during knock, also positively charged carbonaceous particles.

The pulse of ionized gas appears in the engine exhaust near the exhaust valve, regardless of the air to fuel ratio supplied to the combustion chamber. The ionization pulse can be measured by placing an ion knock detector in the exhaust manifold relatively close to the exhaust valve for measuring the electrical conductivity of the exhaust gas. The detector includes at least one electrode exposed to the exhaust gases. A negative dc voltage is applied to the electrode and current flow through the ionized exhaust gas either to a second electrode or to the grounded exhaust system is sensed. In many engines, the ionization pulse will have multiple lobes or peaks due to back pressure pulses in the exhaust gas. To eliminate possible adverse effects from the multiple lobes, the ionization current is integrated with respect to time from a threshold level to the first peak. The resulting data is averaged over several cycles, preferably four cycles, to eliminate errors due to combustion variations from cycle to cycle. Changes in the averaged integrated detector data are used to detect the presence of incipient or actual knock in the engine. However, each cycle also is monitored to provide rapid transition to a transient mode if necessary.

In response to the averaged integrated signals from the knock detector in the exhaust system, the engine ignition system is operated in either a default mode, a steady state mode or a transient mode. When the engine is first started, or when the knock detector current is too high as occurs when the chock is stuck on and carbon builds up on the knock detector, or when the engine is misfiring, the default mode is selected and the ignition spark advance is set to a predetermined starting and "limp home" value, such as 5° advance before top dead center (TDC). As used herein, degrees advance or retard are in crank angle degrees. When the averaged integrated data from the knock detector remains substantially constant, the ignition system is operated in the steady state mode and the spark advance is adjusted to hunt or vary about a timing close to incipient knock for optimum engine efficiency. When the averaged knock detector data is changing, the ignition system is operated in the transient mode. In this mode the ignition timing is incrementally advanced, for example, when the engine is accelerating or is incrementally retarded, for example, when incipient knock is approached. The increments by which the timing is advanced or retarded are determined by the magnitude of changes in the averaged integrated knock detector data and/or the magnitude of the rate of change in the engine speed. The timing domain is fixed for each engine, for example, from 5° before TDC to 60° before TDC for the exemplary engine. The system advances or retards the timing in response to the knock detector data to choose the best timing within the range of the selected timing domain.

The system is particularly suitable for operating with a separate ion knock detector located close to and downstream of the exhaust valve for each cylinder in a multicylinder engine to individually detect incipient knock in each cylinder. The data from the ionized exhaust gas detectors can be used for individually controlling spark advance for each cylinder to optimize the operating efficiency of each cylinder. As a consequence, the whole engine is not penalized because of the weakest cylinder, as in prior art engines.

Accordingly, it is an object of the invention to provide an improved control system for operating a spark ignited internal combustion engine to increase engine operating efficiency without knock.

BEST MODE FOR CARRYING OUT THE INVENTION

In accordance with the invention, it has been found that the exhaust gases from a spark ignited internal combustion engine when monitored close to the exhaust valve contain information on the nature of the combustion process which took place in the engine. As described herein and shown in the drawings, data was taken from a four-stroke cycle, spark ignited, single cylinder fuel research laboratory engine. However, similar results will be obtained from other spark ignited internal combustion engines.

Figure 1:
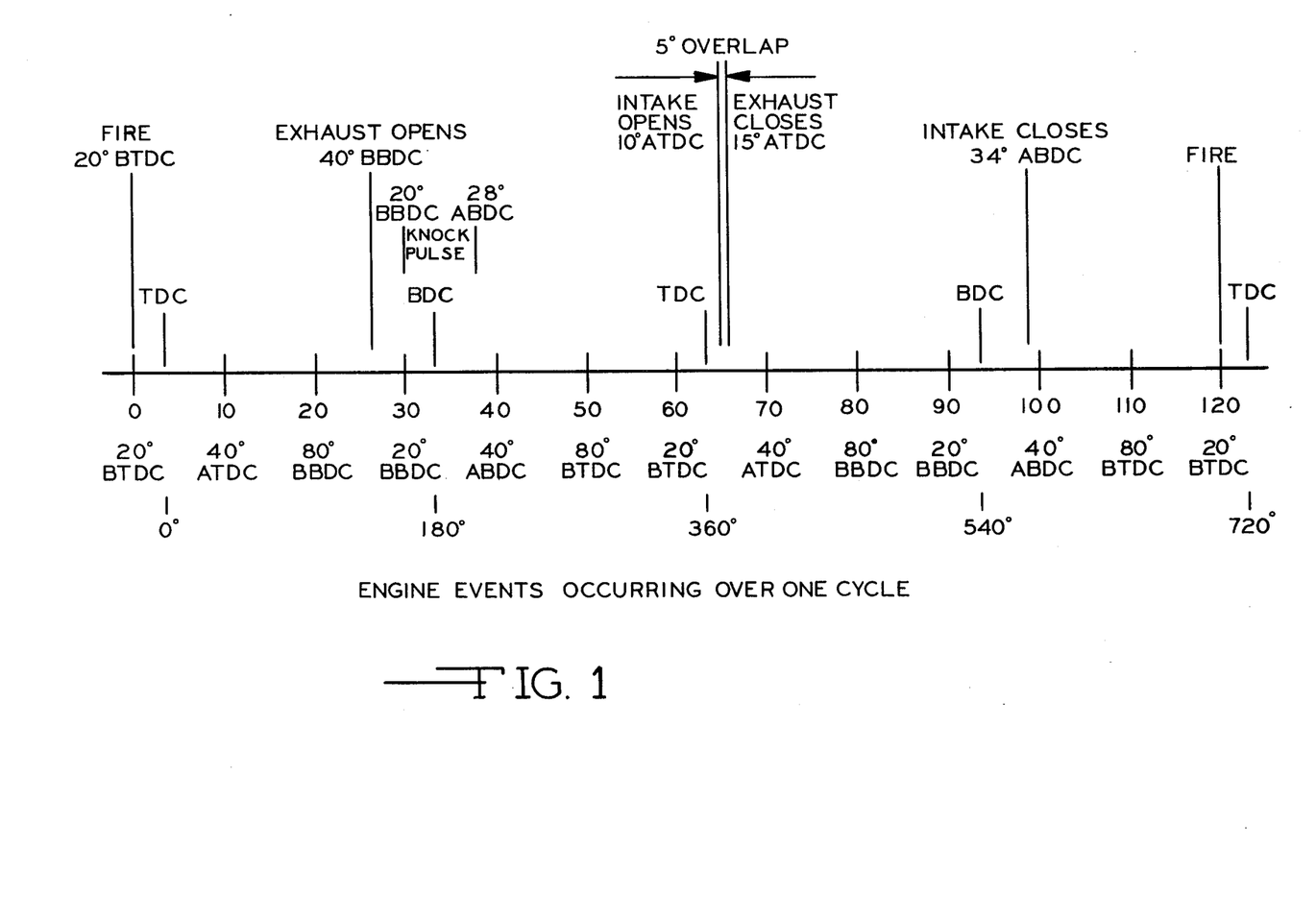
FIG. 1 is a diagram illustrating the timing of events during one operating cycle for an exemplary internal combustion engine operating at 1000 rpm.

FIG. 1 is a diagram illustrating an operating cycle of the exemplary engine when the engine is operating at 1000 rpm. Since the engine is of the four-stroke type, the crankshaft will rotate through two complete revolutions or 720° for each operating cycle. The graph begins at the point of ignition, which has been selected at 20° before the piston reaches TDC. As combustion takes place, the piston moves through TDC and then downwardly in the cylinder. At 40° before the piston reaches bottom dead center (BDC), the exhaust valve opens and exhaust gases begin to flow through the exhaust manifold and past the knock detector. From about 20° before BDC to about 28° after BDC, ionized exhaust gases flow past the ionized gas knock detector. Gases in the exhaust system at the knock detector for the remainder of the engine cycle either are not ionized or have a very low electrical conductivity and there is no further combustion information available at the knock detector. Consequently, the knock detector has an output for only about 48° of the 720° in each cycle.

Figures 2, 3:
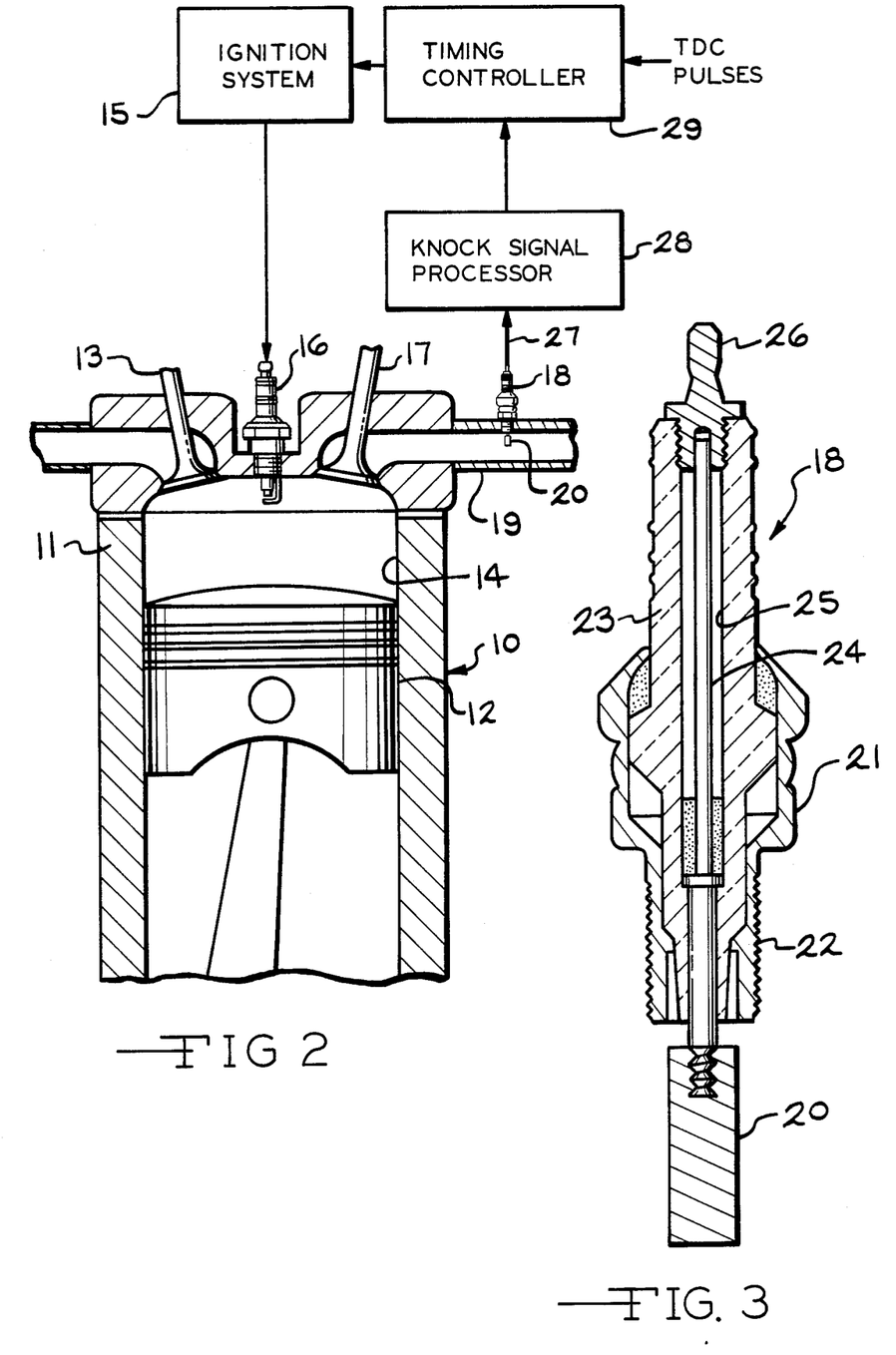
FIG. 2 is a fragmentary diagrammatic view of a spark ignited internal combustion engine having a knock detector mounted in the exhaust manifold just downstream of the exhaust valve and having ignition timing control in response to knock detector data in accordance with the invention.
FIG. 3 is an enlarged vertical cross sectional view of an ionized gas detector for mounting in the exhaust system of an internal combustion engine to detect knock in accordance with the invention.

FIG. 2 is a fragmentary diagram of an internal combustion engine 10 having a cylinder 11 in which a piston 12 reciprocates. The engine 10 has a conventional four-stroke cycle. During a first stroke, the piston 12 moves downwardly while an intake valve 13 is open to admit air and fuel to a combustion chamber 14. As seen in FIG. 1, the intake valve 13 is open from about 10° after TDC to about 34° after BDC. After the intake valve 13 closes and during the upward stroke of the piston 12, the air-fuel mixture in the combustion chamber is compressed. As the piston approaches TDC, an ignition system 15 applies an ignition voltage to a spark plug 16 to ignite the air-fuel mixture in the combustion chamber 14. In the diagram of FIG. 1, ignition took place at 20° before TDC. After ignition, the piston 12 moves through TDC and downwardly on the expansion stroke until an exhaust valve or port 17 opens at 40° before BDC. The piston 12 moves through BDC and upwardly on the exhaust stroke. The exhaust valve 17 remains open until 15° after TDC.

An ionized gas knock detector 18 is mounted in an exhaust manifold or pipe 19 of the engine exhaust system close to and just down stream the exhaust valve 17. Preferably, the knock detector 18 is located within several inches (within about 15 centimeters) of the exhaust valve 17. As the location of the knock detector 18 is moved further downstream from the exhaust valve 17, the ions in the exhaust gas and the combustion information therein rapidly dimension. Therefore, it is critical that the ionized gas knock detector 18 be mounted within a zone downstream of the exhaust valve 17 in which the ionized exhaust gas remains highly ionized. In the broadest scope of the invention, the knock detector 18 comprises two spaced electrodes with an electric potential applied between them. Electric current passing between the electrodes is a function of the electrical conductivity of the exhaust gas at the potential applied between the electrodes. The electrical conductivity of the gas is determined by the nature of the ionic species present, and is a reflection of the previous combustion event. The positive charge carrying components are both ions and particles. The particles appear as knocking combustion is approached.

The knock detector 18 may be, for example, a conventional spark plug or, preferably, similar to a spark plug modified by the addition of a relative massive projecting center electrode end 20 and the elimination of the normal ground electrode, as illustrated in FIGS. 2 and 3. The knock detector 18 has a metal shell 21 with a threaded end 22 for attaching to the exhaust manifold or pipe 19. A ceramic insulator 23 is mounted in the shell and a center electrode 24 is mounted in a bore 25 through the insulator 23. The center electrode 24 has a terminal 26 for attachment to a wire 27 and thence to a knock signal processor 28. The electrode end 20 preferably is either cylindrical, as shown, or round and projects well into the exhaust manifold or pipe 19 and is electrically insulated from the electrically grounded exhaust manifold or pipe 19 which functions as the second electrode in the circuit. The electrode end 20 is made from a corrosion resistant material, such as a stainless steel or a nickel alloy which is capable of withstanding the exhaust gases and the exhaust temperatures.

The knock signal processor 28 applies a negative dc voltage via the wire 27 to the terminal 26. The voltage must be sufficient to cause an electric current to flow from the electrode end 20 through the exhaust gas when it is ionized to the grounded manifold or pipe 19 or to a ground electrode when a spark plug, for example, is used as a knock detector. Preferably, the voltage applied to the knock detector 18 is on the order of −200 to −600 volts. Although this voltage is higher than necessary, it provides a strong current signal which is unaffected by electrical noise which is normally present around spark ignited engines.

When a substantially constant voltage is applied to the knock detector electrode end 20, a current will flow through the knock detector 18 which is a function of the degree of ionization of exhaust gases between the knock detector electrode end 20 and the adjacent grounded exhaust pipe or manifold 19. The current is detected by the knock signal processor 28 which produces a filtered output voltage proportional to the detector current level.

The knock signal processor 28 produces an output signal which contains information on the presence of knock or incipient knock or pre-ignition in the operating engine 10. A timing controller 29 includes control logic responsive to information in the output from the knock signal processor 28 and to TDC pulses from the running engine. The TDC pulses may be generated by conventional methods, for example, by sensing rotation of a point on an engine flywheel. The TDC pulses indicate the position of the piston and the speed of the engine.

The timing controller 29 supplies timing pulses to cause the ignition system 15 to establish and apply ignition voltage to the spark plug 16 to initiate combustion. The ignition system 15 is of a conventional design, such as is found on many modern automobiles and typically include an ignition module, an ignition coil and a distributor. However, as used herein, the ignition system 15 does not include spark advance timing apparatus or circuitry.

The timing controller 29 includes logic for establishing the ignition timing pulses. While the engine is cranking and initially starting, the timing controller 29 will not receive continuous knock detector data. Until continuous data is received, the timing controller 29 sets a minimum spark advance, for example, 5° before TDC. Initially, two sparks are produced in each cycle in a four stroke engine, one before each TDC pulse. Once the engine has fired and knock detector data is flowing to the timing controller, each TDC pulse is labeled to provide only one firsting signal per cycle. After the engine is running, the timing controller 29 adjusts the ignition timing toward the optimum timing within the timing domain of, for example, 5° before TDC to 60° before TDC.

Figure 4:
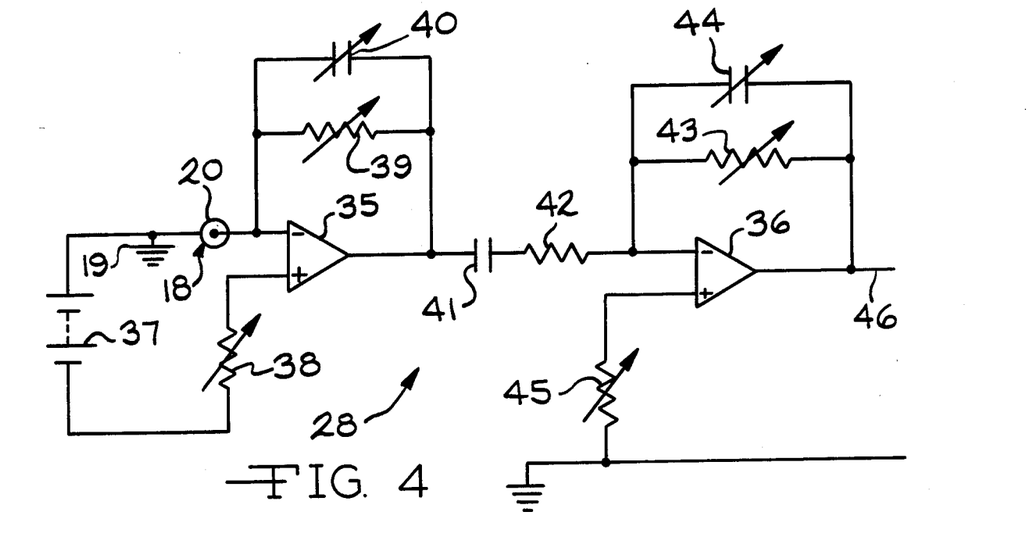
FIG. 4 is a schematic diagram of a circuit for amplifying, a conditioning and integrating the ion current signal from the detector of FIG. 3.

FIG. 4 illustrates an exemplary circuit for the knock signal processor 28. The illustrated knock signal processor 28 generally comprises two integrated circuit operational amplifiers 35 and 36. The amplifier 35 performs a current-to-voltage transformation and reduces noise while the amplifier 36 functions as an inverting amplifier. Where required for a specific engine application, additional amplifying and filtering stages may be provided. The ion and particle current through the knock detector 18 can be measured by the operational amplifier 35 by injecting the current directly into a summing node. Thus, the knock detector electrode end 20 is connected directly to the negative or inverting input to the amplifier 35. A dc voltage source, such as a battery 37, is connected from the grounded exhaust pipe or manifold 19 through a resistor 38 to the positive or non-inverting input to the amplifier 35. The amplifier 35 is provided with a negative feedback resistor 39 and a parallel trimming capacitor 40. The input current from the knock detector 18 is fed directly into the summing node for the amplifier 35 and the amplifier output voltage changes to extract the same current from the summing node through the resistor 39. Where the resistor 39 has a resistance of $R_1$, the scale factor of the amplifier 35 is $R_1$ voltage per ampere. The only conversion error in this amplifier is from the bias current which is summed algebraically with the input current. Bias current error is minimized by selecting the resistor 38 with a resistance $R_2$ equal to the resistance $R_1$ of the resistor 39. By adding the trimming capacitor 40, the operational amplifier 35 also serves as a low pass filter which eliminates high frequency electrical noise.

The output from the amplifier 35 is coupled through a capacitor 41 and a resistor 42 to the inverting input of the amplifier 36. The amplifier 36 has a negative feedback resistor 43 and a parallel capacitor 44. The non-inverting input to the amplifier 36 is connected through a resistor 45 to ground and an output 46 from the amplifier 36 is connected to the timing controller 29 of FIG. 2. Where the resistor 43 has a resistance $R_3$ and the resistor 42 has a resistance $R_4$, the amplifier 36 will have a closed loop gain of $R_3/R_4$. The resistance $R_4$ of the resistor 42 is chosen such that the impedance introduced by the coupling capacitor 41 is negligible.

Figure 5:
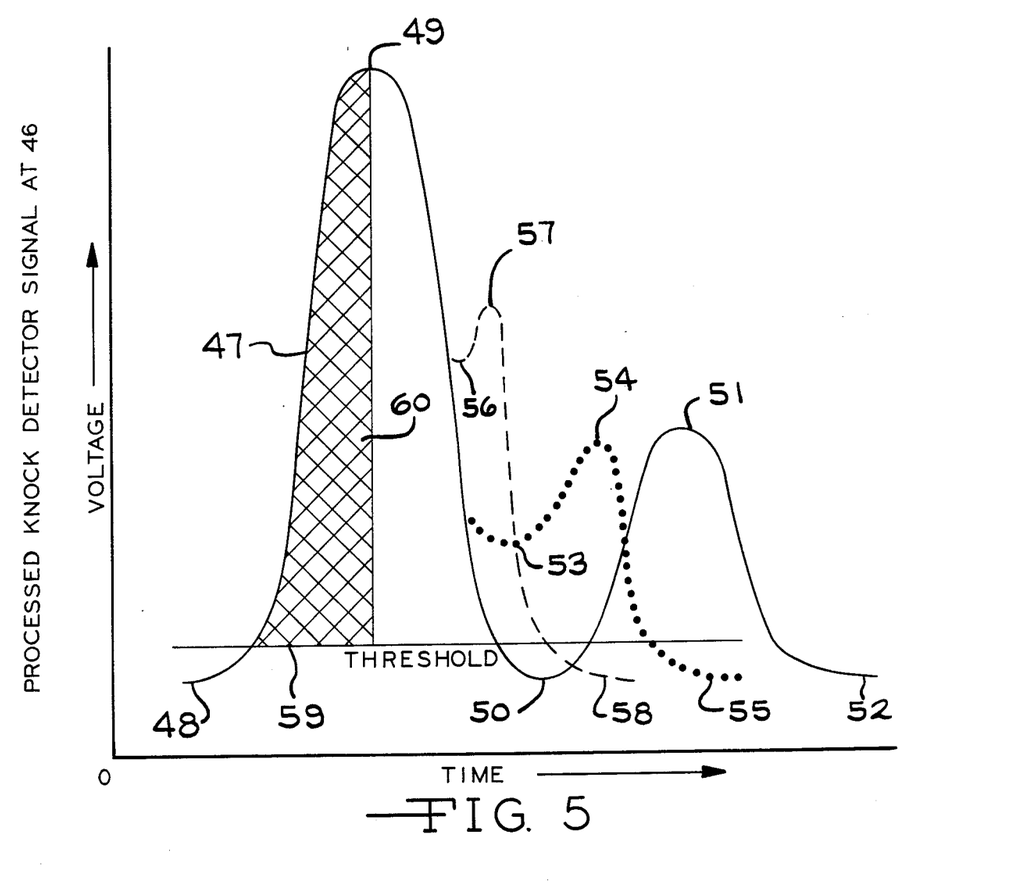
FIG. 5 is a diagram showing exemplary signals from an ionized gas detector mounted in an engine exhaust manifold just downstream of the exhaust valve when the engine is operated at three different speeds.

A representative diagram of three types of analog signals obtained at the output 46 from the knock signal processor 28 is shown in FIG. 5. The signals shown in FIG. 5 were produced on an oscilloscope from the processed knock detector output 46 from FIG. 4. The knock detector 18 was mounted in the exhaust manifold or pipe 19 of an engine 10 approximately 6 inches (about 15 centimeters) downstream from the exhaust valve 17. As previously illustrated in FIG. 1 for the operating cycle of the exemplary engine 10, the exhaust valve opens at 40° before BDC and thereafter the exhaust gases begin to flow through the exhaust manifold 19. From about 20° before BDC to about 28° after BDC, the gases flowing past the detector 18 are ionized and contain information on the nature of the combustion process which took place in the combustion chamber 14.

The solid curve 47 in FIG. 5 illustrates the knock detector signal as taken at the output 46 from the signal processor 28 when the engine 10 is operating at 1,000 rpm. The curve 47 progresses in time from a low value 48 to a first peak value 49, drops to a minimum value 50, increases to a secondary peak 51 which is lower that the peak 49, and finally drops to a low value 52. The secondary peak 51 on the curve 47 is regarded as coming from a pulsating backflow of the exhaust gas. The secondary peak 51 may be substantially reduced or eliminated if the engine exhaust system is tuned for the engine operating speed.

When the engine speed is increased to 1,500 rpm, the knock signal processor output 46 extends from the low value 48 to the peak value 49 and drops to a minimum value 53, as illustrated by a dotted line, which is greater in magnitude than the minimum value 50. The signal then increases to a secondary peak 54 and drops to a low value 55. When the engine speed is further increased to 2,100 rpm, the processed knock detector signal goes from the low value 48 to the peak value 49 and drops to a minimum value 56, as illustrated by a dashed line, which is greater in magnitude than the minimums 53 and 50. From the minimum 56, the curve goes to a peak 57 and drops to a final low value 58.

Both the magnitude of the peak 49 and the integral or area under the curve 47 contain information on the combustion process which resulted in the curve 47. However, this information is degraded by the secondary peak 51, 54 or 57 which vary due to factors such as engine speed and exhaust tuning. Although the secondary peaks 51, 54 and 57 can be attenuated, it has been found that all of the necessary knock data is available in the curve 47 between an arbitrary threshold level 59 which is greater than the lows 48, 52, 55 and 58 and the peak 49. By integrating the curve 47 from the threshold 59 to the peak 49, the shaped area 60 under this portion of the curve 47 is measured. The integration may be accomplished either by conventional electronic circuitry (not shown) which includes a peak detector, a threshold level detector and an integration circuit or the analog curve 47 may digitized and the integration process may be accomplished through logic software (exemplified in the flow chart of FIG. 8) within the timing controller 29. By using only the shades area 60 under the curve 47 or the intergral of the "half-first-peak" of the curve 47 above the threshold 59, all extraneous information is eliminated. This reduces considerably the "combustion event characterization time" for more rapid timing selection and reduces computing power required to perform the timing function.

Figure 6:
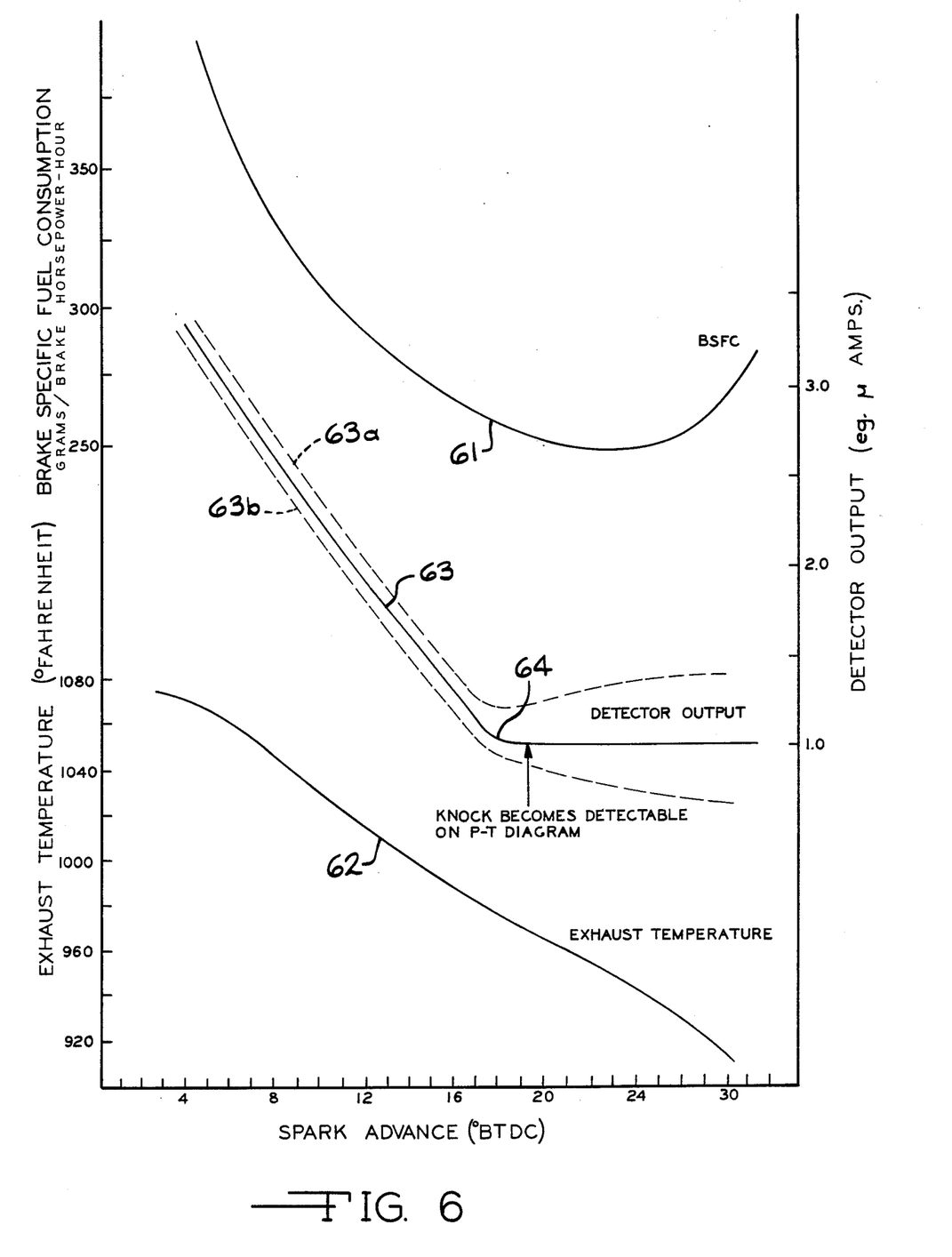
FIG. 6 is a graph showing brake specific fuel consumption (BSFC), exhaust temperature and knock detector data for different spark advances before top dead center in an exemplary operating engine.

FIG. 6 is a graph showing three separate curves produced by the exemplary single cylinder, four stroke engine operating at a maintained constant speed with an applied load. A curve 61 shows the engine brake specific fuel consumption (BSFC) for various ignition spark advances before TDC. A curve 62 shows the exhaust temperature near the exhaust valve 17 for various ignition spark advances before TDC. A curve 63 shows the time averaged knock detector output for the same range of spark advances before TDC. The data for the curve 63 may be either the value of the current peak 49 on the curve 47 of FIG. 5 or the threshold-to-peak area 60 under the curve 47. Either one will produce the same configuration for the curve 63, only changing in units and magnitude.

The curve 63 is an ideal curve which results only if successive combustion events are uniform. As a practical matter, successive combustion events will vary. The averaged information for successive combustion events will lie between the dashed curves 63a and 63b, provided the engine operating parameters remain constant. The curve 63 and the normal scatter zone between the curves 63a and 63b are for constant engine parameters such as speed, load and air-to-fuel ratio. In reality, there is a family of similar curves for different engine parameters. As any parameter is gradually changed, the curve 63 may gradually move up to down and/or to the left or to the right, even though the spark advance may not change.

From the graph of FIG. 6, it will be seen that the exhaust gas temperature drops off fairly linearly as the spark advance before TDC is increased. However, as the spark timing is advanced into heavy knocking, i.e., at timings greater than about 30° before TDC for the experimental conditions shown, the temperature falls even more markedly. The knock detector output curve 63 also decreases fairly linearly with an increase in spark advance up to an inflection point 64 at about 17° advance before TDC. This point 64 is the point of incipient knock. As spark advance is further increased from 17° before TDC, the ideal knock detector output remains substantially constant. Thus, there is a distinct change in the slope of the curve 63 at the point 64 of incipient knock. However, the scatter of the averaged knock detector information increases significantly, as shown by the increased spread between the dashed curves 63a and 63b. It should be noted that the point 64 on the curve 63 is approximately 1° prior to knock becoming detectable on a conventional pressure-time diagram and it is believed 1° to 2° before knock is detectable by prior art vibration type knock sensors. During numerous experimental tests running the exemplary engine with various air-to-fuel mixtures, compression ratios, speeds and loads, the curves 61, 62 and 63 of FIG. 6 were found to be characteristic and not to change in form, only to change in magnitude.

By operating the engine at a spark advance outside the knock range but very close to the inflection point 64 on the curve 63, the engine is operated close to the minimum on the BSFC curve 61, and thus close to its peak thermal efficiency, and its minimum advance for best torque (MBT).

The reason for the change in the slope of the curve 63 at the point 64 of incipient knock is the subject of ongoing research. Prior to the onset of knock, the exhaust gas conductivity is probably due to positively charged gaseous ions which are dependent upon and fall with the temperature of the exhaust gas. With the onset of knock at the point 64 on the curve 63, positively charged carbonaceous particles present in the exhaust gas may offset the drop in electrical conductivity that otherwise would occur from the further drop in the exhaust gas temperature. Possibly the reason that the knock detector current is constant when the spark advance is changed while the engine is operating within the knock region is due to the mobility of the charged carbonaceous particles being very much less than that of the gaseous ions that generate the knock detector signal in the non-knocking range. For example, the mobilities of the positive ions have been measured at 2.2 $cm^2/V$ second, while those of the charged particles have been measured at 0.025 $cm^2/V$ second for a mobility difference on the order of four magnitudes.

As previously indicated, the combustion process will vary somewhat from cycle to cycle under the best steady-state conditions. The scatter in combustion chamber peak pressures between individual combustion events can be as high as ±30% during "steady-state" operation. If ignition timing for each cycle is set in response to knock detector data from only the last cycle and the knock detector data deviated from normal due to normal scatter, the ignition timing will be set at less than optimum. For this reason, it is necessary to average several of the integrated knock detector pulses to smooth out a given "steady-state" so that the control system does not over-react to normal fluctuations in an individual cycle. It has been found that using an average of the integrated knock detector pulses over four cycles is optimum. If fewer than four pulses are averaged, an individual cycle which deviates from the average due to normal scatter will have an increased effect on ignition timing. Using more than four pulses for calculating the average appears to have no significant beneficial effect and increases the response time to parameter changes in the operating engine which require a change in the ignition timing. The average of groups of four signals is primarily for the steady state operating mode. The system keeps a running average at all times to detect change. In the most sophisticated form, individual events (signals) also are monitored for rapid detection of, and response to, a transient. Such a transient would take the system rapidly out of the steady state inflection hunt mode.

Figure 7:
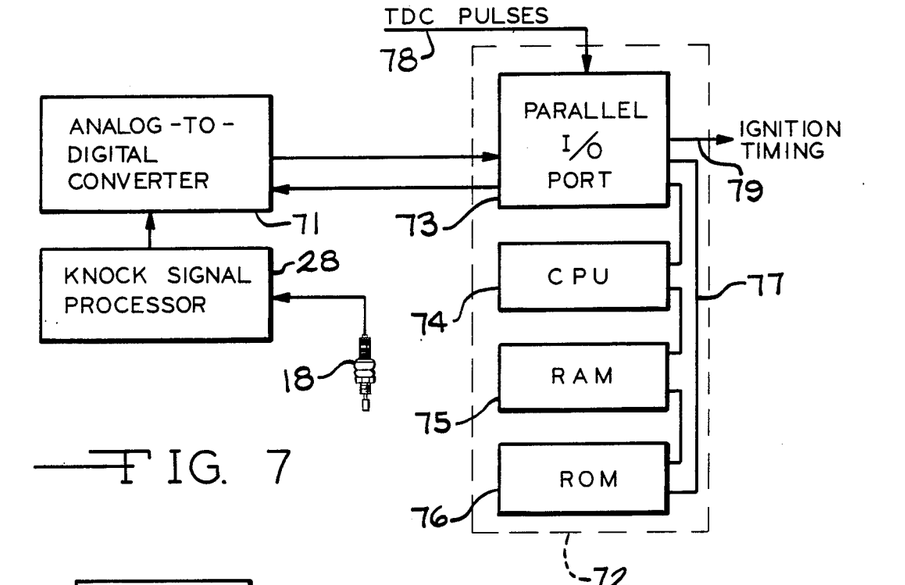
FIG. 7 is a schematic block diagram of an exemplary ignition timing controller.

FIG. 7 is a block diagram of an exemplary control system 70 which includes the knock detector 18 and the knock signal processor 28 from FIG. 2. The knock signal processor 28 produces an anlog output voltage which is proportional to the conductivity of the engine exhaust gas just downstream from the exhaust valve. This voltage is digitized by an analog-to-digital converter 71. Or, the analog voltage may be integrated by a conventional electronic integration circuit (not shown), temporarily stored and applied to the converter 71. The digitized knock detector data is applied to a data processor 72 which includes a parallel input/output (I/O) port 73, a central processing unit (CPU) 74, a random access memory (RAM) 75 and a read only memory (ROM) 76. The I/O port 73, the CPU 74 and the RAM 75 are commercially available integrated circuits. The ROM 76 is an integrated circuit containing software and data for implementing the logic required for controlling ignition timing in response to the knock detector data. The I/O port 73, CPU 74, RAM 75 and ROM 76 are interconnected by a parallel address and data control bus 77. In addition to the digitized knock detector data, the I/O port 73 has an input 78 for receiving TDC pulses from the engine to provide an ignition timing reference point and for determining engine speed and the rate of change of engine speed. The I/O port 73 also has an ignition timing data output 79 which triggers the engine ignition system 15 of FIG. 2.

The ROM 76 stores a program for controlling operation of the data processor 72 to control the engine ignition timing. The ROM 76 also may include a program or subroutine for integrating the processed knock detector pulse from the processor 28, if a separate electronic integrating circuit is not connected between the knock signal processor 28 and the analog-to-digital converter 71.

Figure 8:
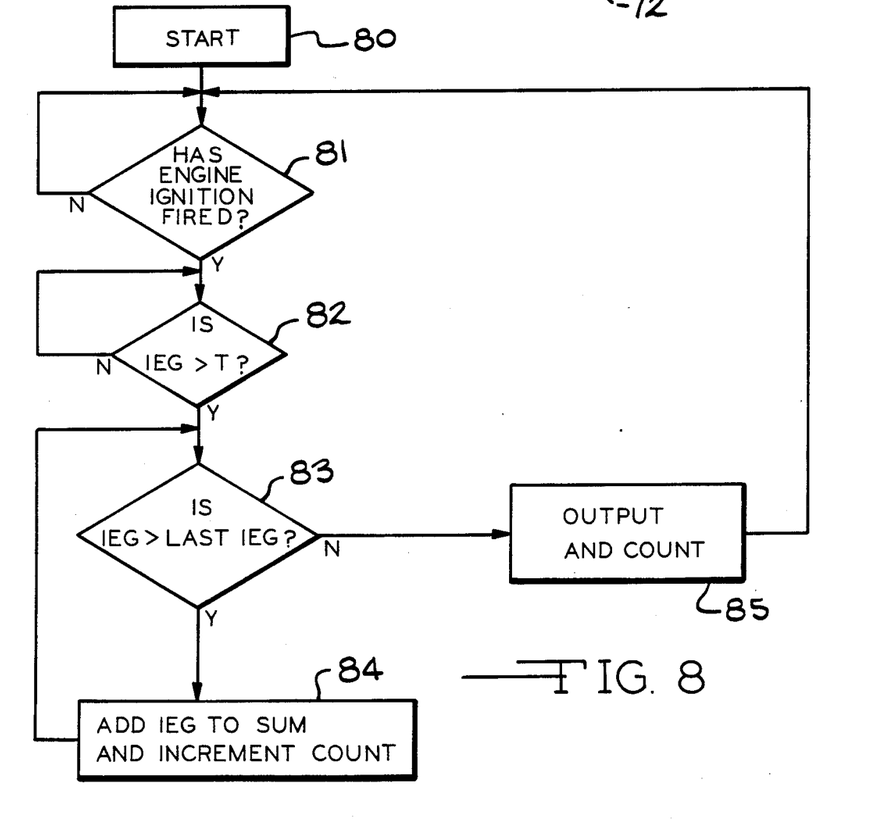
FIG. 8 is a logic diagram of a subroutine for integrating the digitized processed signal from the ion ionized gas detector of FIG. 3.

FIG. 8 is a logic diagram of a subroutine for operating the data processor 72 to integrate the processed and digitized knock detector data. From a start step 80, a step 81 determines if the engine ignition has fired. If there has been no ignition, the logic waits for the next ignition point in the engine cycle. After ignition, a step 82 compares the digitized ionized exhaust gas (IEG) data from the converter 71 with a predetermined threshold (T) stored in the ROM 76. The logic waits until the IEG data is greater than the threshold. When the IEG data exceeds the threshold, a comparison is made at a step 83 between the current IEG data and the immediately previous IEG data. If the current IEG data is greater than the last IEG data, then the peak of the ionization pulse has not yet occurred and the IEG data if added in a counter in the CPU 74 to a sum of the IEG data and a count of the number of digits in the digitized IEG data is incremented by one at a step 84. The logic than returns to the step 83 and the next IEG data from the converter 71 is compared with the last IEG data. This is repeated until the first peak (peak 49 of the curve 47 in FIG. 5) is reached. When the peak is reached, the logic moves from the step 83 to a step 85 which outputs the sum of the IEG data and the counter and returns the logic to the step 81 to wait for the next ignition pulse. If the knock data curve has a secondary peak (peaks 51, 54 and 57 in FIG. 5), it is ignored since the logic at step 81 waits until the engine ignition has fired again. From the outputted sum and count the CPU 74 calculates the area under the curve 47 between the threshold 59 and the first peak 49.

Figure 9:
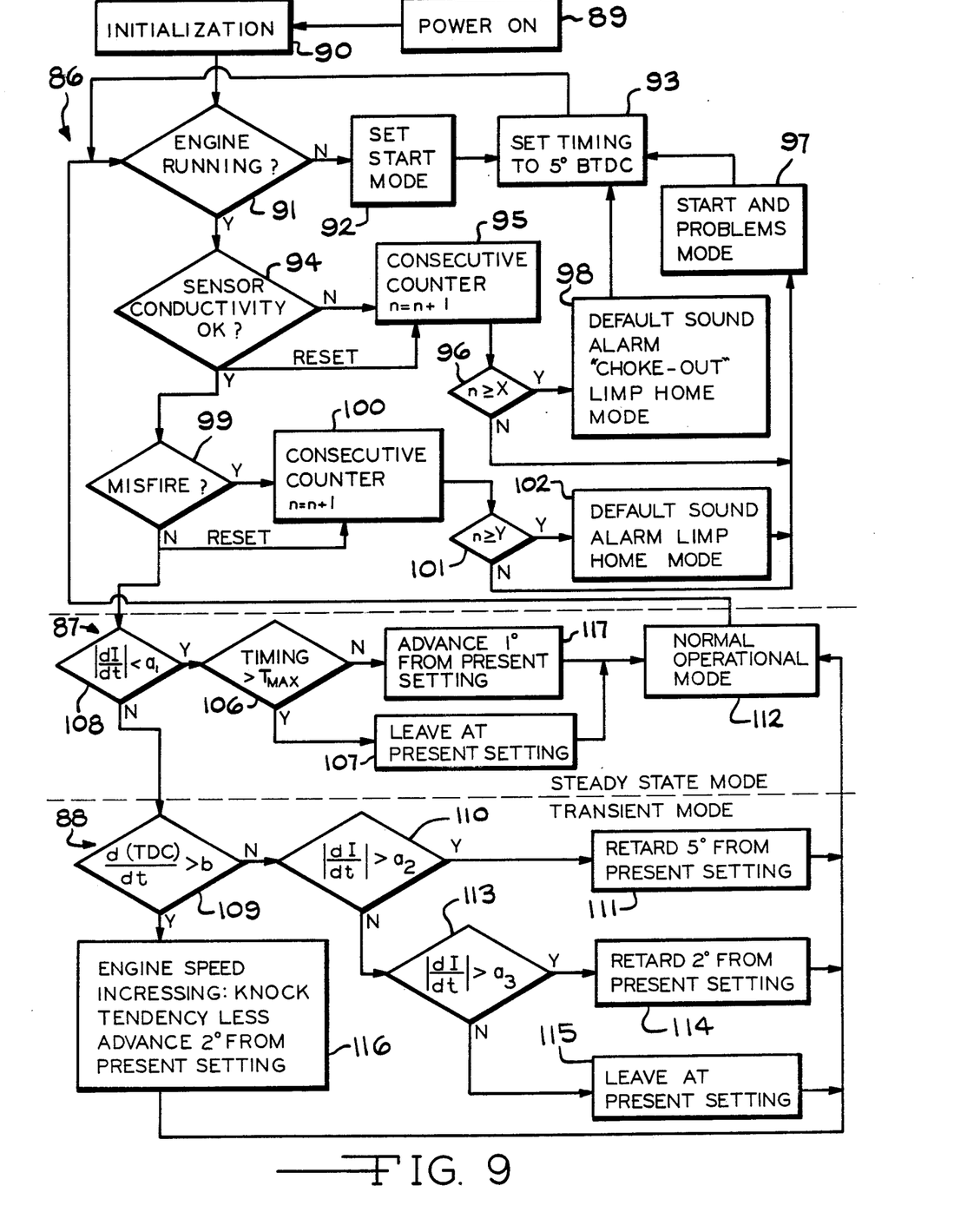
FIG. 9 is a logic diagram of a system for controlling spark advance in an operating engine in response to TDC timing pulses from the engine and data from the ionized exhaust gas knock detector.

FIG. 9 is a logic diagram illustrating operation of the data processor 72 to control spark advance in the operating engine. The logic has three major sections: a section 86 which represents a default mode which includes start-up, a section 87 which represents a steady-state mode and a section 88 which represents a transient mode. When the engine is initially started, power is turned on at a step 89 and the system is initialized at a step 90. A check is made at a step 91 to determine if the engine is running. If not, a start mode is set at a step 92, the ignition timing is set to 5° before TDC at a step 93 and the logic returns to the step 91. This cycle is repeated until the engine has started. A timing of 5° before TDC has been selected at the most retarded boundary of the timing domain and as a default timing for starting the engine and for operating the engine in the event of problems such as when the choke is stuck on and the resulting carbon buildup prevents the knock detector from operating or when the engine is misfiring. The boundary of the timing domain may be arbitrarily set to a different value, for example, 2° before TDC, depending upon the engine operating characteristics.

When the engine is running, the logic advances from the step 91 to a step 94 which checks the knock detector conductivity. When the choke remains on, the knock detector conductivity may become 2 to 3 times higher than normal. It should be noted that a voltage is maintained on the knock detector at all times. The knock detector conductivity can be checked simply by looking at the current through the knock detector at a time when ionized exhaust gas is not present. High current could mean that the choke is on or that there is a leaky valve or some other problem. If the knock detector conductivity is too high at the step 94, a number "n" in a counter in the CPU 74 is incremented by one at step 95. The incremented number "n" in the counter then is compared at a step 96 with a predetermined number "x" which was stored in the ROM 76. The number "x" is a predetermined number of sequential engine cycles with low detector resistance (high conductivity) which causes a default alarm. If the incremented number n<x, the logic cycles through a start and problem mode step 97 to the step 93 wherein the engine ignition advance is set to or maintained at 5° before TDC and then back to the step 91. If n≧x at the step 96, than the logic advances to the step 93 through a default step 98 which activates an alarm, such as a warning light or an audible alarm, to inform the engine operator of the problem.

It will be appreciated that the logic may be modified to provide a modest spark advance when the knock detector output fails. If, for example, the sensor is temporarily incapacitated due to a failure of the carburetor resulting in excessive use of the choke, the timing controller may be programmed to provide a modest speed advance, for example, an additional 5° advance increase for each 1000 rpm engine speed increase. The operator would be advised that his choke had failed, based upon logic in the logic steps 94 and 95. If, and as soon as, the carbon cleared from the sensor (this would be rapid due to high exhaust temperature of the over retarded condition in a temporary choke malfunction) normal operation would resume.

If the knock detector conductivity is within normal limits at the step 94, the counter is reset and the logic advances to a step 99 which checks for engine misfire. If the engine misfired, there will be no data from the knock detector. In this case, a number "n" in a counter in the CPU 74 is incremented at a step 100 and this incremented number is compared with a number "y" from the ROM 76 at a step 101. The number "y" is a predetermined number of sequential misfires permitted before an alarm is activated. If the incremented number n<y, then the logic passes through the steps 97 and 93 to the step 91. When n≧y, the logic advances through a step 102 and the steps 97 and 93 to the step 91. A default alarm, which may include a warning light or an audible alarm, is activated at the step 102.

If the engine was running, as determined at the step 91, and the knock detector conductivity was satisfactory, as determined at the step 94, and the engine was not misfiring, as determined at the step 99, the logic advances from the default mode 86 to a step 108 in the steady-state mode 87. The misfire counter at the step 100 may be reset when the logic advances to the step 108, or it may be reset automatically after the elapse of a predetermined time period after the first detection of a misfire. At the step 108, the absolute value of the rate of change (dI/dt) of the integrated and averaged knock detector data (I) is compared with a predetermined number "$a_1$" from the ROM 76. Ideally, the ignition timing is very close to the inflection point 64 on the knock detector current curve 63 in FIG. 6 and the engine is operating under steady state conditions so that dI/dt approaches zero. Small changes in the averaged knock detector data over a period of time are to be expected and $a_1$ will be a small number such as 0.1 for a 10% permissible change or 0.01 for a 1% permissible change.

If the absolute value of (dI/dt)>$a_1$, then either the engine is operating at or to the right of the incipient knock inflection point 64 on the curve 63 in FIG. 6, or a preignition event was observed, or the engine operating parameters are changing, for example, the engine load is increasing, and the logic advances from the step 108 to the transient mode 88 and a step 109 which checks the magnitude of any rate of change in the engine speed as represented by the rate of change in TDC pulses (dTDC/dt). The rate of engine speed change is compared with a predetermined number "b" read from the ROM 76. The number "b" is much greater than zero. If (dTDC/dt)<b, it indicates that the engine speed is not changing significantly. There may be a significant change in the throttle position and little change in engine speed, which under open throttle produces a danger of knock. The logic then advances to a step 110 which compares the absolute value of the rate of change in the average integrated knock detector data (dI/dt) with a predetermined large number "$a_2$" read from the ROM 76. If the absolute value of (dI/dt)>$a_2$, there is a high risk of knock or anomalous combustion since there is a significant scatter or variation in dI/dt. Therefore, the spark timing is retarded 5° from its present setting at a step 111. The logic than recycles through a step 112 back to the step 91 in the default mode 86. If the absolute value of $(dI/dt)<a_2$ at the step 110, the risk of knock is less and the logic advances to a step 113 wherein the absolute value of $dI/dt$ is compared with another number "$a_3$" read from the ROM 76. The number $a_3$ is smaller than $a_2$ and larger than $a_1$ and indicates that there is less risk of knock. If at the step 113 the absolute value of $(dI/dt)>a_3$, than the spark timing is retarded only 2° from its present setting at a step 114 since the risk of knock is less than when $(dI/dt)<a_2$ at the step 111 and the logic recycles through the step 112 back to the step 91. If the absolute value of $(dI/dt)<a_3$ at the step 113, than the engine is operating under steady state conditions to the left of the inflection point 64 on the curve 63 in FIG. 6 and the present spark advance setting is maintained constant at at a step 115 and the logic cycles through the step 112 to the step 91. Of course, additional logic steps may be provided for comparing the absolute value of the rate of change in the averaged integrated knock detector data $(dI/dt)$ with additional constants and for retarding the spark advance by different amounts. It also will be appreciated that the 5° retard at step 111 and the 2° retard at step 114 are intended to be exemplary and that the spark timing may be retarded by other amounts.

If the engine was accelerating appreciably at the step 109, then $(dTDC/dt)>b$ and the logic advances to a step 116. A reduction in the tendency to knock accompanies the increase in engine speed and the ignition timing is advanced 2° from its present setting at the step 116. The logic then cycles through the step 112 to the step 91. It will be appreciated that the rate of speed change in the accelerating engine can be compared with more than one constant and, depending on the magnitude of the rate of speed change, the ignition timing can be advanced by increments other than 2°.

If the engine was operating under constant conditions and to the left of the incipient knock inflection point 64 on the curve 63 of FIG. 6, the absolute value of $(dI/dt)<a_1$ at the step 108. In this case, the logic advances in the steady state mode to a step 106 which checks if the timing has reached a preset boundary of the timing domain, for example, 60° advance before TDC. If the maximum timing $T_{max}$ has not been reached, the logic advances to a step 117 wherein the spark timing is advanced by a predetermined small amount, such as 1°. The logic then cycles through the step 112 to the step 91. If the maximum timing $T_{max}$ was reached at the step 106, the logic leaves the spark timing at its present setting at a step 107 and advances to the step 112. This ensures that the engine timing will not be advanced indefinitely in the unlikely situation when the engine never knocks, for example, due to an extremely low compression ratio. So long as the engine is running without frequent misfire and with a proper knock detector conductivity, the logic returns to the step 108 and any change in the averaged integrated knock detector output is again compared with $a_1$. If the engine is operating to the left of the inflection point 64 on the curve 63 of FIG. 6, the absolute value of $dI/dt$ will remain greater than $a_1$ and the spark timing will be advanced another 1° at the step 117. If the spark timing had approached the inflection point 64 and the averaged knock detector current begins to scatter to the point that $a_1<(dI/dt)<a_3$, than the logic advances from the step 108 through the steps 109, 110, 113 and 115 and the ignition timing is maintained unchanged. If at the last advance at the step 117 the timing approached incipient knock, than $a_2>(dI/dt)>A_3$ and the spark timing is retarded 2° from its present setting at the step 114. If there was a higher risk of knock after the timing was advanced at the step 117, for example, due to a change in the engine operating conditions, than the absolute value of $(dI/dt)>a_2$ on the next cycle and the spark timing is retarded 5° at the step 111. Thus, the ignition timing will hunt about a point near, but to the left of the incipient knock point 64 on the curve 63 in FIG. 6. The actual point about which the ignition timing hunts is determined by the selection of the constants $a_1$, $a_2$ and $a_3$. For example, the engine may be operated with $a_1=4\%$ scatter, $a_3=25\%$ scatter and $a_2=50\%$ scatter in the averaged knock detector data.

Figure 10:
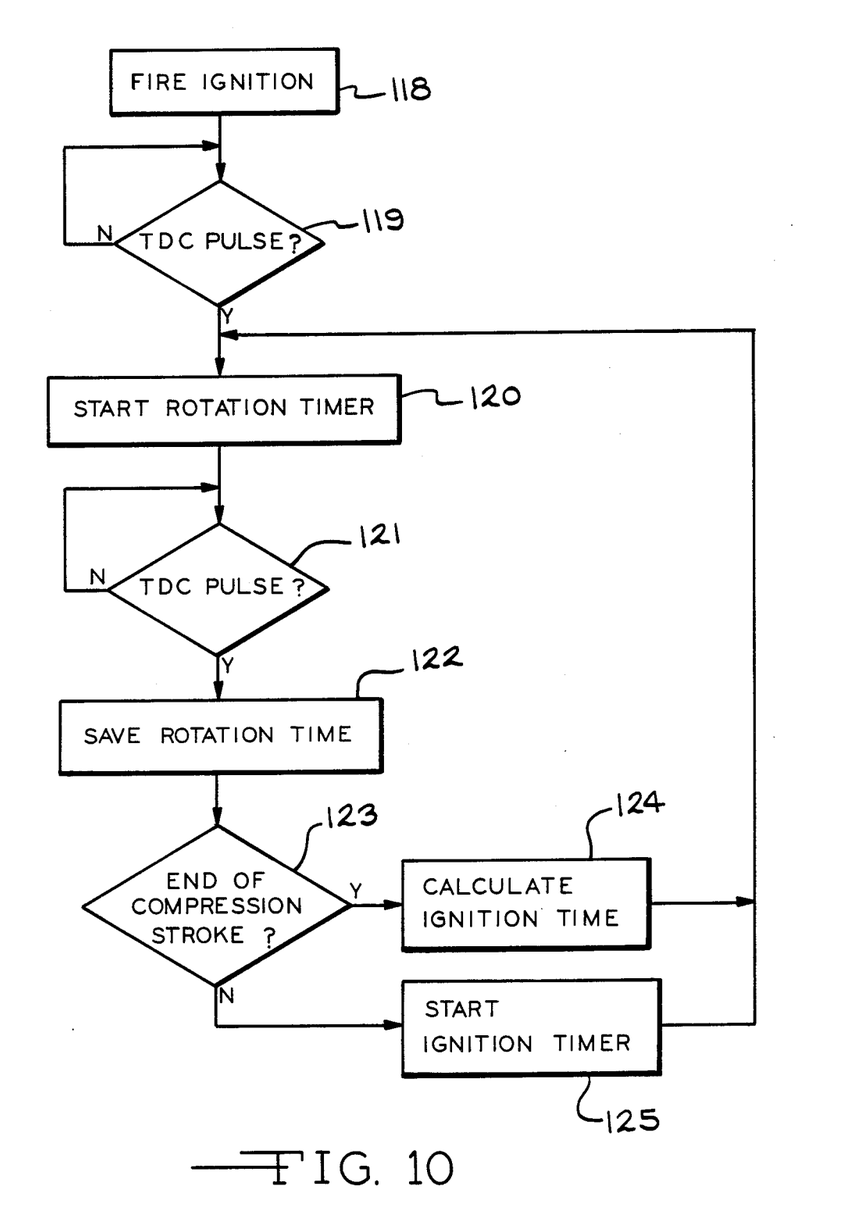
FIG. 10 is a logic diagram of a subroutine for establishing the timing signal for triggering the engine ignition system.

FIG. 10 is a logic diagram of a subroutine for operating the data processor 72 for producing the ignition output 79 which triggers the engine ignition system 15. The subroutine is entered at a step 118 and advances to a step 119 which waits for the next TDC pulse applied from the engine 10 to the data processor input 78. As soon as a TDC pulse is received, a rotation timer in the CPU 74 is started at a step 120. The subroutine then waits at a step 121 for the next TDC pulse. When the next TDC pulse is received, the rotation time between two successive TDC pulses is stored at a step 122. At the next step 123, the data processor 72 determines if the engine is at the end of the compression stroke or the end of the exhaust stroke. If the engine is at the end of the compression stroke, the ignition time is calculated at a step 124. The ignition time is the time lapse between the TDC pulse at the end of the exhaust stroke and spark ignition of the air-fuel mixture. Ignition occurs prior to the next TDC pulse. The logic returns to the step 120 to restart the rotation timer. A wait again occurs at the step 121 for the next TDC pulse and, upon receipt of such pulse, the rotation time is again stored at step 122 and a check is again made at the step 123 for the end of the compression stroke. The engine will now be at the end of the exhaust stroke since it was previously at the end of the compression stroke and an ignition timer will be started at a step 125. The ignition timer measures from the TDC pulse the time calculated at the step 124 and, upon the elapse of such time, causes the data processor 72 to apply a signal on the ignition output 79 to cause the ignition system 15 to fire the spark plug 16.

When the engine 10 is first started, the timing controller 29 may not known which engine stroke is associated with each TDC pulse. In this case, the timing controller 29 may deliver two ignition signals to the ignition system 15 in each engine cycle. The spark plug 16 will fire just prior to completion of the compression stroke and again just prior to completion of the exhaust stroke. This second firing will have no effect on engine operation since there is no fuel in the combustion chamber at the time of the second firing. After the engine 10 has started, the timing controller 29 can distinguish between the two TDC pulses in each engine cycle since the knock detector 18 will have an output after the compression stroke TDC pulse and before the exhaust stroke TDC pulse.

Software for implementing the process illustrated by the logic diagrams of FIGS. 8-10 will be apparent to and readily developed by one skilled in the art. It will be appreciated that various additions and changes may be made to the above described ignition control for spark ignited internal combustion engines without departing from the spirit and the scope of the following claims. For example, the control is described for a four stroke engine having a single combustion chamber. The control is equally adaptable to a two stroke engine and to an engine having multiple combustion chambers with a separate knock detector mounted for individually monitoring the ionized exhaust gas from each chamber. It will be apparent that a single control system may be adapted to individually control spark timing for each combustion chamber on a time sharing basis. Thus, each chamber can be operated at an optimum efficiency without knocking, even though the timing requirements may vary between the individual combustion chambers. It also will be apparent that the control system may be connected to control an engine parameter other than ignition timing for operating an internal combustion engine at maximum efficiency without knock. For example, the control system may modify the air to fuel ratio individually for each combustion chamber in an engine or the control system may control a waste gate in a turbocharged engine to prevent knock.

What is claimed is:

1. A control for a spark ignited internal combustion engine having at least one combustion chamber having a combustion cycle, means for producing timing pulses having a predetermined relationship to the engine cycle, a spark plug mounted for igniting an air-fuel mixture within said chamber, an ignition system responsive to a timed signal from said control for supplying an ignition voltage to said spark plug and a port for exhausting combustion gases from said chamber, said control comprising detector means for producing an electric signal proportional to the degree of the electrical conductivity of exhaust gases passing through said port, means for averaging such detector means signal over a predetermined number of ignition cycles to generate an averaged detector means signal, and means responsive to such averaged detector means signal in successive ignition cycles and to such timing pulses for applying a timed signal to said ignition system to produce ignition timing near maximum engine efficiency without knock.

2. A control, as in claim 1, wherein said detector means comprises an electrode mounted in an engine exhaust system downstream of said exhaust port within a zone in which ionized exhaust gases passing through said port remain ionized, and means for applying a dc voltage between said electrode and said exhaust system whereby a current flows through said electrode proportional to the degree of exhaust gas conductivity at said electrode.

3. A control, as in claim 1, wherein said signal applying means includes means for detecting an abnormal detector means signal while said detector means is not exposed to electrically conductive exhaust gases, and means responsive to such abnormal detector means signal in a preselected number of engine cycles for causing such timed signal to produce a predetermined ignition timing.

4. A control, as in claim 1, wherein said signal applying means includes means for detecting when said engine misfires, and means responsive to detecting a predetermined number of engine misfires for causing such timed signal to produce a predetermined ignition timing.

5. A control for a spark ignited internal combustion engine having at least one combustion chamber having a combustion cycle, means for producing timing pulses having a predetermined relationship to the engine cycle, a spark plug mounted for igniting an air/fuel mixture within said chamber, an ignition system responsive to a timed signal from said control for supplying an ignition voltage to said spark plug and a port for exhausting combustion gases from said chamber, said control comprising detector means for producing an electric signal proportional to the degree of the electrical conductivity of exhaust gases passing through said port, means for averaging such detector means signal over a predetermined number of ignition cycles to generate an averaged detector means signal, and means responsive to such averaged detector means signal in successive ignition cycles and to such timing pulses for applying a timed signal to said ignition system to produce ignition timing near maximum engine efficiency without knock, said signal applying means including means for integrating such detector means signal in each cycle between a predetermined threshold level and a first peak in such detector means signal, said means for averaging operative to average such integrated signal over said predetermined number of ignition cycles, and wherein said signal applying means is responsive to changes in such averaged integrated signals for applying a timed signal to said ignition system.

6. A control, as in claim 5, wherein siad signal applying means further includes means for measuring any change in successive averaged integrated detector means signals, and means for advancing the ignition timing for the next engine cycle from the timing for the previous cycle by a first predetermined number of degrees when the change in such averaged integrated signals exceeds a predetermined first amount.

7. A control, as in claim 6, wherein said signal applying means further includes means responsive to such timing pulses for measuring any rate of change in engine speed, and means for advancing the ignition timing for the next engine cycle from the timing for the previous cycle by a second predetermined number of degrees when the change in such averaged integrated signals is less than said first amount and the rate of change in engine speed exceeds a second amount.

8. A control, as in claim 7, wherein said signal applying means further includes means for retarding the ignition timing for the next engine cycle from the timing for the previous cycle by a third predetermined number of degrees when the change in such averaged integrated signals is less than said first amount and the rate of change in engine speed is less than said second amount.

9. A control, as in claim 7, wherein said signal applying means further includes means for retarding the ignition timing for the next engine cycle from the timing for the previous cycle by a third predetermined number of degrees when the change in such averaged integrated signals is less than a third amount smaller than said first amount and the rate of change in engine speed is less than said second amount.

10. A control, as in claim 9, wherein said signal applying means further includes means for retarding the ignition timing for the next engine cycle from the timing for the previous cycle by a fourth predetermined number of degrees when the change in such averaged integrated signals is less than a fourth amount smaller than said second amount.

11. A control for an internal combustion engine having at least one combustion chamber having a combustion cycle, means for producing timing pulses having a predetermined relationship to each engine cycle, a variable parameter effecting each combustion event in said combustion chamber, means responsive to a control signal from said control for adjusting said variable parameter, and a port for exhausting combustion gases from said chamber, said control comprising detector means for producing an electric signal proportional to the degree of electrical conductivity of exhaust gases passing through said port, means for averaging said detector means signal over a predetermined number of ignition cycles to generates an averaged detector means signal, and means responsive to said averaged detector means signal in successive combustion cycles and to such timing pulses for applying a control signal to said variable parameter adjusting means to operate the engine at maximum efficiency without knock.

12. A control for a spark ignited internal combustion engine having at least one combustion chamber having a combustion cycle, means for producing timing pulses having a predetermined relationship to the engine cycle, a spark plug mounted for igniting an air/fuel mixture within said chamber, an ignition system responsive to a timed signal from said control for supplying an ignition voltage to said spark plug and a port for exhausting combustion gases from said chamber, said control comprising detector means for producing a pulsed electric signal having a magnitude proportional to the degree of electrical conductivity of exhaust gases passing through said port, said pulsed detector means signal defining a first pulse followed by at least one secondary pulse for each ignition cycle, and means responsive to only said first pulse of said pulsed detector means signal in each ignition cycle and to such timing pulses for applying a timed signal to said ignition system to produce ignition timing near maximum engine efficiency without knock.

13. A control for an internal combustion engine having at least one combustion chamber having a combustion cycle, means for producing timing pulses having a predetermined relationship to each engine cycle, a variable parameter effecting each combustion event in said combustion chamber, means responsive to a control signal from said control for adjusting said variable parameter, and a port for exhausting combustion gases from said chamber, said control comprising detector means for producing a pulsed electric signal having a magnitude proportional to the degree of electrical conductivity of exhaust gases passing through said port, said pulsed detector means signal defining a first pulse followed by at least one secondary pulse for each combustion cycle, and means responsive to only said first pulse of said pulsed detector means signal in each combustion cycle and to such timing pulses for applying a control signal to said variable parameter adjusting means to operate the engine at maximum efficiency without knock.

14. A control, as in claim 12, wherein said means responsive to only said first pulse includes means for averaging information from said first pulse over a predetermined number of ignition cycles.

15. A control, as in claim 12, wherein said spark ignited internal combustion engine has a plurality of combustion chambers each having a separate combustion cycle, a separate spark plug mounted for igniting an air/fuel mixture within each of said chambers, said ignition system responsive to a separate timed signal from said control for each combustion chamber for selectively supplying an ignition voltage to each of said spark plugs and a separate port for exhausting combustion gases from each of said chambers, said control including a separate detector means located in each of said ports for producing a separate pulsed electric signal proportional to the degree of electrical conductivity of exhaust gases passing through each of said ports, and said means responsive to said detector means signals applies a separate timed signal for each combustion chamber to said ignition system to individually control the ignition timing for each combustion chamber to operate the engine near maximum efficiency without knock.

* * * * *